(12) United States Patent
Liu et al.

(10) Patent No.: US 12,725,412 B2
(45) Date of Patent: Sep. 1, 2026

(54) VIDEO ANALYSIS APPARATUS, VIDEO ANALYSIS METHOD, AND NON-TRANSITORY STORAGE MEDIUM

(71) Applicant: NEC Corporation, Tokyo (JP)

(72) Inventors: Jianquan Liu, Tokyo (JP); Ryo Kawai, Tokyo (JP); Noboru Yoshida, Tokyo (JP); Satoshi Yamazaki, Tokyo (JP); Tingting Dong, Tokyo (JP); Karen Stephen, Tokyo (JP); Yuta Namiki, Tokyo (JP); Naoki Shindou, Tokyo (JP); Youhei Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 18/215,540

(22) Filed: Jun. 28, 2023

(65) Prior Publication Data

US 2024/0013534 A1 Jan. 11, 2024

(30) Foreign Application Priority Data

Jul. 5, 2022 (JP) ................................ 2022-108650

(51) Int. Cl.
*G06V 40/10* (2022.01)
*G06V 20/40* (2022.01)

(52) U.S. Cl.
CPC .............. *G06V 20/40* (2022.01); *G06V 40/10* (2022.01)

(58) Field of Classification Search
CPC ............................... G06V 20/40; G06V 40/10
See application file for complete search history.

(56) References Cited

U.S. PATENT DOCUMENTS 11,570,316 B2 * 1/2023 Okazaki ............. H04N 1/00323
11,743,431 B2 * 8/2023 Carey ................... H04W 8/005 348/150
11,776,309 B2 * 10/2023 Kida ...................... G06V 10/25 382/115
2011/0231419 A1 * 9/2011 Papke .................. G06F 16/784 707/769
2020/0221054 A1 * 7/2020 Carey .................... G06V 20/53
2021/0375117 A1 * 12/2021 Updike ................ G08B 21/182
2021/0390840 A1 * 12/2021 Rejal ...................... G06N 3/088
2022/0028535 A1 1/2022 Ryan et al.
(Continued)

FOREIGN PATENT DOCUMENTS

CN 113194581 A * 7/2021 ................ F21S 8/08
JP 2019-200715 A 11/2019
(Continued)

OTHER PUBLICATIONS

Frontoni et al. "People counting in crowded environment and re-identification." RGB-D Image Analysis and Processing. Cham: Springer International Publishing. (Year: 2019).*
(Continued)

*Primary Examiner* — Shaghayegh Azima
(74) *Attorney, Agent, or Firm* — Sughrue Mion, PLCC

(57) ABSTRACT

To utilize a result of analyzing an interval between persons included in a video, a video analysis apparatus 100 includes an interval acquisition unit 110 and a display control unit 113. The interval acquisition unit 110 acquires an interval between persons included in a video acquired by photographing a target region. The display control unit 113 causes a display unit to display a time-series transition of first information relating to the number of persons with the acquired interval being equal to or less than a reference value.

11 Claims, 23 Drawing Sheets

(56) References Cited

U.S. PATENT DOCUMENTS

| | | | | |
|---|---|---|---|---|
| 2022/0101632 | A1* | 3/2022 | Onozato | G06V 40/23 |
| 2022/0172481 | A1* | 6/2022 | Addison | G06T 7/62 |
| 2022/0230105 | A1* | 7/2022 | Hioki | G06F 3/14 |

FOREIGN PATENT DOCUMENTS

| | | | | |
|---|---|---|---|---|
| JP | 6764214 | B1 | 9/2020 | |
| JP | 2022-053151 | A | 4/2022 | |
| WO | WO-2020148890 | A1 * | 7/2020 | G06V 40/172 |
| WO | 2021/084677 | A1 | 5/2021 | |

OTHER PUBLICATIONS

Conte, Donatello, et al. “A method for counting people in crowded scenes.” 2010 7th IEEE International Conference on Advanced Video and Signal Based Surveillance. IEEE. (Year: 2010).*

Gloudemans, Derek, et al. “Quantifying social distancing compliance and the effects of behavioral interventions using computer vision.” Proceedings of the Workshop on Data-Driven and Intelligent Cyber-Physical Systems. (Year: 2021).*

Zhe Cao, Tomas Simon, Shih-En Wei, Yaser Sheikh, “Realtime Multi-Person 2D Pose Estimation using Part Affinity Fields”; The IEEE Conference on Computer Vision and Pattern Recognition (CVPR), 2017, pp. 7291-7299.

Partial European Search Report for EP Application No. 23183584.4, dated on Nov. 28, 2023.

Jacques Saraydaryan et al., “People Management Framework Using a 2D Camera for Human-Robot Social Interactions”, Dec. 1, 2019 (Dec. 1, 2019), pp. 268-280, Topics in Cryptology—CT-RSA 2020, The Cryptographers’ Track at the RSA Conference 2020, San Francisco, CA, USA, Feb. 24-28, 2020.

JP Office Action for JP Application No. 2022-108650, mailed on Mar. 17, 2026 with English Translation.

* cited by examiner

| ANALYSIS INFORMATION | | | | | |
|---|---|---|---|---|---|
| IMAGE INFORMATION | | | ANALYSIS RESULT | | |
| IMAGE ID | PHOTO-GRAPHING APPARATUS ID | PHOTO-GRAPHING TIME | PERSON ID | POSITION | APPEARANCE ATTRIBUTE |

FIG. 20

| THIRD INFORMATION | | | | | | |
|---|---|---|---|---|---|---|
| IMAGE INFORMATION | | | DENSE INFORMATION | | | |
| IMAGE ID | PHOTO-GRAPHING APPARATUS ID | PHOTO-GRAPHING TIME | DENSE REGION ID | PERSON ID | POSITION | APPEARANCE ATTRIBUTE |

VIDEO ANALYSIS APPARATUS, VIDEO ANALYSIS METHOD, AND NON-TRANSITORY STORAGE MEDIUM

RELATED ART

The present invention relates to a video analysis apparatus, a video analysis method, and a non-transitory storage medium.

PTL 1 (Japanese Patent No. 6764214) discloses a congestion state notification system for promoting elimination of overcrowding. The congestion state notification system generates, based on an image acquired by photographing a monitoring target area, a privacy-protected image subjected to image processing in such a way that a person in the photographed image is displayed only with skeletal information. The congestion state notification system displays a loop line indicating an outer edge of each circular area within a predetermined distance from each person at an actual distance in the monitoring target area, in a superimposed manner in the privacy-protected image while moving the loop line according to movement of each person. The congestion state notification system transmits, as congestion information, the privacy-protected image in which the loop line is displayed in a superimposed manner.

PTL 2 (International Patent Publication No. WO 2021/084677) describes a technique of calculating a feature value of each of a plurality of keypoints of a human body included in an image, searching for an image including a human body having a similar pose or a human body having a similar motion, based on the calculated feature value, and classifying images with similar poses or motions together. NPL 1 (Zhe Cao, Tomas Simon, Shih-En Wei, Yaser Sheikh, [Realtime Multi-Person 2D Pose Estimation using Part Affinity Fields]; The IEEE Conference on Computer Vision and Pattern Recognition (CVPR), 2017, PP. 7291-7299) describes a technique related to skeleton estimation of a person.

SUMMARY

PTL 1 does not describe using a result of analyzing an interval between persons included in a video, in addition to transmitting the privacy-protected image. PTL 2 and NPL 1 also do not disclose a technique for utilizing a result of analyzing an interval between persons included in a video.

An example object of the present invention is to provide a video analysis apparatus, a video analysis method, a program and the like that solve the above-described problem of utilizing a result of analyzing an interval between persons included in a video.

According to one aspect of the present invention, there is provided a video analysis apparatus including: an interval acquisition means for acquiring an interval between persons included in a video acquired by photographing a target region; and a display control means for causing a display means to display a time-series transition of first information relating to the number of persons with the acquired interval being equal to or less than a reference value.

According to one aspect of the present invention, there is provided a video analysis apparatus including: an interval acquisition means for acquiring an interval between persons included in a video acquired by photographing a target region; and a display control means for causing a display means to display third information indicating, in at least three stages, a dense level of the persons in a superimposed manner on an image indicating the target region, the third information being acquired based on the acquired interval.

According to one aspect of the present invention, there is provided a video analysis method including, by a computer: acquiring an interval between persons included in a video acquired by photographing a target region; and causing a display means to display a time-series transition of first information relating to the number of persons with the acquired interval being equal to or less than a reference value.

According to one aspect of the present invention, there is provided a program for causing a computer to execute: acquiring an interval between persons included in a video acquired by photographing a target region; and causing a display means to display a time-series transition of first information relating to the number of persons with the acquired interval being equal to or less than a reference value.

According to one aspect of the present invention, there is provided a video analysis method including, by a computer: acquiring an interval between persons included in a video acquired by photographing a target region; and causing a display means to display third information indicating, in at least three stages, a dense level of the persons in a superimposed manner on an image indicating the target region, the third information being acquired based on the acquired interval.

According to one aspect of the present invention, there is provided a program for causing a computer to execute: acquiring an interval between persons included in a video acquired by photographing a target region; and causing a display means to display third information indicating, in at least three stages, a dense level of the persons in a superimposed manner on an image indicating the target region, the third information being acquired based on the acquired interval.

According to one aspect of the present invention, it is possible to utilize a result of analyzing an interval between persons included in a video.

BRIEF DESCRIPTION OF THE DRAWINGS

FIG. 6 is a diagram illustrating a configuration example of analysis information.

FIG. 20 is a diagram illustrating a configuration example of third information according to the second example embodiment.

EXAMPLE EMBODIMENT

Figure 1:
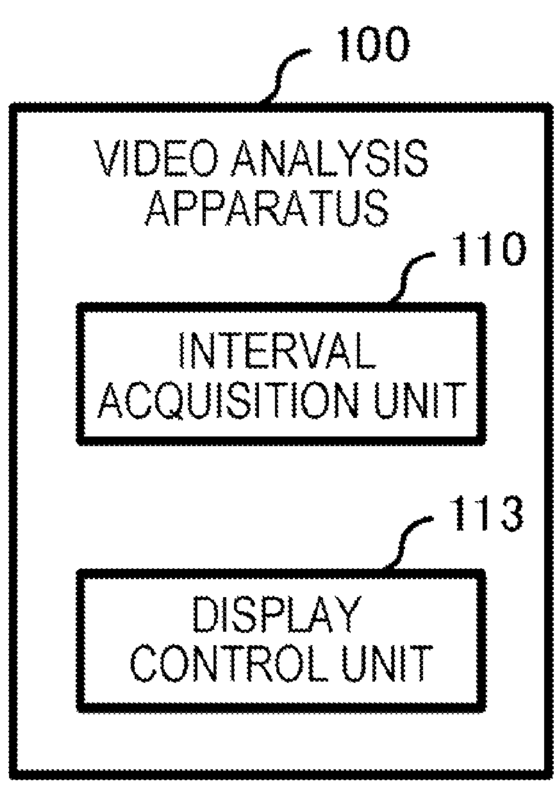
FIG. 1 is a diagram illustrating an outline of a video analysis apparatus according to a first example embodiment.

Hereinafter, example embodiments of the present invention will be explained by using the drawings. In all the drawings, the same components are denoted by the same reference numerals, and explanation thereof will be omitted as appropriate.

First Example Embodiment

FIG. 1 is a diagram illustrating an outline of a video analysis apparatus 100 according to a first example embodiment. The video analysis apparatus 100 includes an interval acquisition unit 110 and a display control unit 113.

The interval acquisition unit 110 acquires an interval between persons included in a video acquired by photographing a target region. The display control unit 113 causes a display unit to display a time-series transition of first information relating to the number of persons with the acquired interval being equal to or less than a reference value.

According to the video analysis apparatus 100, it is possible to utilize a result of analyzing the interval between persons included in the video.

Figure 2:
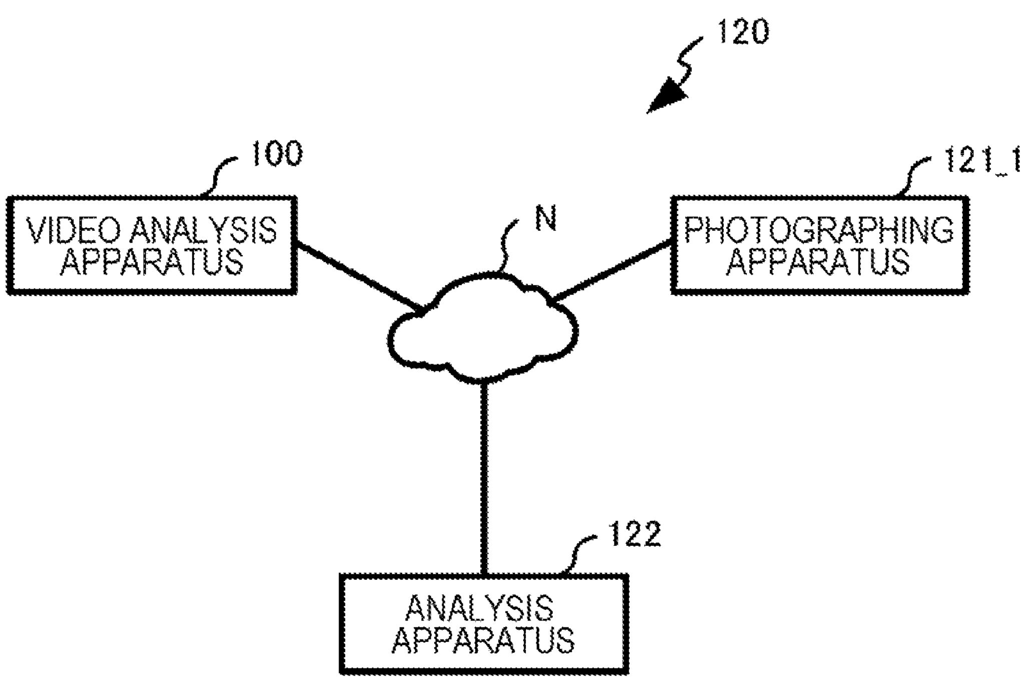
FIG. 2 is a diagram illustrating an outline of a video analysis system according to the first example embodiment.

FIG. 2 is a diagram illustrating an outline of a video analysis system 120 according to the first example embodiment. The video analysis system 120 includes a video analysis apparatus 100, at least one photographing apparatus 121_1, and an analysis apparatus 122.

The photographing apparatus 121_1 is an apparatus that generates a video by photographing a target region. The analysis apparatus 122 analyzes the video and thereby detects a person included in the video, and at the same time, determines the position of the person.

According to the video analysis system 120, it is possible to utilize the result of analyzing the interval between persons included in the video.

Figure 3:
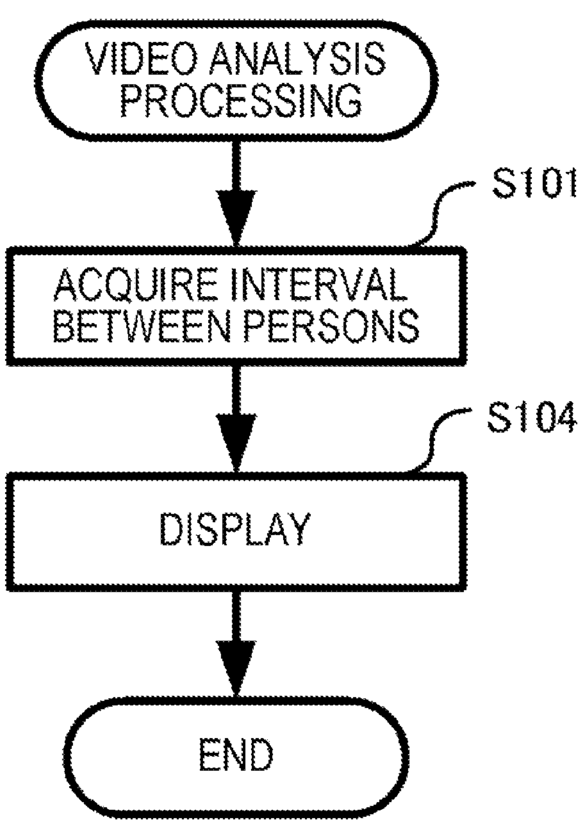
FIG. 3 is a flowchart illustrating an example of video analysis processing according to the first example embodiment.

FIG. 3 is a flowchart illustrating an example of video analysis processing according to the first example embodiment.

The interval acquisition unit 110 acquires an interval between persons included in a video acquired by photographing a target region (step S101). The display control unit 113 causes a display unit to display a time-series transition of first information relating to the number of persons with the acquired interval being equal to or less than a reference value (step S104).

According to the video analysis processing, it is possible to utilize a result of analyzing the interval between persons included in the video.

Hereinafter, a detailed example of the video analysis system 120 according to the first example embodiment will be explained.

Figure 4:
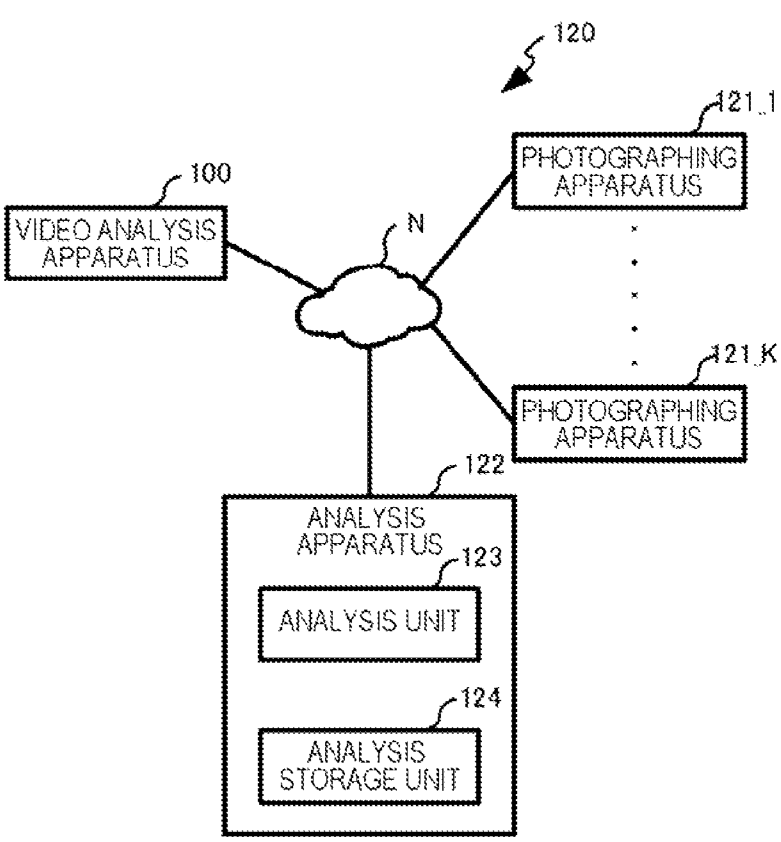
FIG. 4 is a diagram illustrating a detailed example of a configuration of a video analysis system according to the first example embodiment.

FIG. 4 is a diagram illustrating a detailed example of a configuration of the video analysis system 120 according to the present example embodiment.

The video analysis system 120 includes a video analysis apparatus 100, K photographing apparatuses 121_1 to 121_K including the photographing apparatus 121_1, and an analysis apparatus 122. Herein, K is an integer of 1 or more.

The video analysis apparatus 100, each of the photographing apparatuses 121_1 to 121_K, and the analysis apparatus 122 are connected to each other via a communication network N configured by wire, radio, or a combination thereof. The video analysis apparatus 100, each of the photographing apparatuses 121_1 to 121_K, and the analysis apparatus 122 transmit and receive information to and from each other via the communication network N.

(Configuration of the Photographing Apparatuses 121_1 to 121_K)

Each of the photographing apparatuses 121_2 to 121_K is an apparatus that generates a video acquired by photographing a target region, similarly to the above-described photographing apparatus 121_1. Each of the photographing apparatuses 121_1 to 121_K is, for example, a camera installed in order to photograph a predetermined photographing region in a predetermined target region. The target region may be a building, a facility, a municipality, a prefecture, or the like, and may be a range appropriately determined among these. The photographing regions of the photographing apparatuses 121_1 to 121_K may partially overlap one another, or may be regions different from one another.

The video photographed by any one of the photographing apparatuses 121_2 to 121_K is composed of, for example, a time-series frame image (hereinafter, also simply referred to as "image") photographed at a predetermined frame rate. Each of the photographing apparatuses 121_2 to 121_K transmits a video acquired by photographing to the analysis apparatus 122 via the communication network N, for example, in real time.

(Function of Analysis Apparatus 122)

The analysis apparatus 122 analyzes a video acquired by photographing performed by each of the photographing apparatuses 121_1 to 121_K. As illustrated in FIG. 4, the analysis apparatus 122 includes an analysis unit 123 and an analysis storage unit 124.

The analysis unit 123 acquires image information 124*a* including images constituting the video from each of the photographing apparatuses 121_1 to 121_K, and stores the acquired image information 124*a* in the analysis storage unit 124. The analysis unit 123 analyzes an image included in each of the acquired image information 124*a*. The analysis unit 123 generates analysis information 124*b* indicating a result of analyzing the image, and stores the analysis information in the analysis storage unit 124. The analysis unit 123 transmits the image information 124*a* and the analysis information 124*b* to the video analysis apparatus 100 via the communication network N.

The analysis unit 123 analyzes an image by using a plurality of types of engines. Various types of engines have a function for analyzing an image and detecting a detection target included in the image. The detection target includes a person. The detection target may include a predetermined object such as an automobile or a bag.

The analysis unit 123 may acquire an appearance attribute of a person included in the image by analyzing the image using a plurality of types of engines.

The appearance attribute is an attribute on the appearance of a person. The appearance attribute includes, for example, one or more of age group, gender, type of clothing (e.g., casual, formal, etc.) or color of clothing, type of shoes (e.g., sneakers, leather shoes, high heels, etc.) or color of shoes, hairstyle, wearing or non-wearing of a hat, wearing or non-wearing of a tie, wearing or non-wearing eyeglasses, carrying or not carrying an umbrella, and the like.

Examples of the engine type include (1) an object detection engine, (2) a face analysis engine, (3) a humanoid analysis engine, (4) a pose analysis engine, (5) a behavior analysis engine, (6) an appearance attribute analysis engine, (7) a gradient feature analysis engine, (8) a color feature analysis engine, and (9) a flow line analysis engine. Note that the analysis apparatus 122 may include at least one of an engine of the type exemplified here and an engine of another type.

(1) The object detection engine detects a person and an object from an image. An object detection function can also acquire positions of the person and the object in the image. An example of a model to be applied to object detecting processing is You Only Look Once (YOLO).

(2) The face analysis engine detects a face of a person from an image, extracts a feature value (face feature value) of the detected face, classifies (divides into classes) the detected face, and the like. The face analysis engine may also acquire a position of the face within the image. The face analysis engine can also assess the identity of the person detected from a different image, based on the similarity between face feature values of the person detected from the different image, or the like.

(3) The humanoid analysis engine extracts a human-body feature value of a person included in an image (for example, a value indicating overall features such as lean body shape, height, and clothing), classifies (divides into classes) a person included in the image, and the like. The humanoid analysis engine can also determine a position of the person within the image. The humanoid analysis engine can also assess the identity of a person included in a different image, based on the human-body feature value of the person included in the different image, or the like.

(4) The pose analysis engine generates pose information indicating a pose of a person. The pose information includes, for example, a pose estimation model of a person. The pose estimation model is a model in which a joint of a person estimated from an image is connected. The pose estimation model includes a plurality of model elements, which are associated to, for example, a joint element associated to a joint, a trunk element associated to a torso, a bone element associated to a bone connecting joints, and the like. A pose analysis function, for example, detects a joint point of a person from an image and creates a pose estimation model by connecting the joint points.

Then, the pose analysis engine estimates the pose of the person by using information of the pose estimation model, extracts the feature value (pose feature value) of the estimated pose, classifies (divides into classes) persons included in the image, and the like. The pose analysis engine can also assess the identity of a person included in a different image, based on the pose feature values of the person included in the different image, or the like.

For example, the techniques disclosed in PTL 2 and NPL 1 can be applied to the pose analysis engine.

(5) The behavior analysis engine can estimate a motion of a person by using information of a pose estimation model, a change in a pose, and the like, extract a feature value (motion feature value) of the motion of the person, classify (divide into classes) a person included in an image, and the like. In the behavior analysis engine, a height of the person can be estimated or a position of the person in the image can be determined by using information of a stick figure model. The behavior analysis engine can estimate an action such as a change or transition of a pose, and a movement (change or transition of a position) from an image, and extract a motion feature value related to the action, for example.

(6) The appearance attribute analysis engine can recognize an appearance attribute associated with a person. The appearance attribute analysis engine extracts a feature value (appearance attribute feature value) related to the recognized appearance attribute, and classifies (divides into classes) a person included in an image, and the like. The appearance attribute is an attribute in appearance and includes, for example, one or more of: color of clothing, color of shoes, hairstyle, wearing or not wearing a hat, a tie, or eyeglasses, and the like.

(7) The gradient feature analysis engine extracts a feature value (gradient feature value) of gradient in an image. For example, a technique such as SIFT, SURF, RIFF, ORB, BRISK, CARD, or HOG can be applied to the gradient feature analysis engine.

(8) The color feature analysis engine can detect an object from an image, extract a feature value (color feature value) of a color of the detected object, classify (divide into classes) the detected object, and the like. The color feature value is, for example, a color histogram or the like. The color feature analysis engine can detect a person or an object included in the image, for example.

(9) The flow line analysis engine can acquire a flow line (a trajectory of movement) of a person included in a video by using, for example, a result of assessment of identity that is performed by any one or a plurality of the above-described engines. Specifically, for example, a person assessed to be the same among images that are different in time series is connected, whereby a flow line of the person can be acquired. Further, for example, the flow line analysis engine can acquire a movement feature value indicating a movement direction and a movement velocity of a person. The movement feature value may be any one of a movement direction and a movement velocity of a person.

When a video photographed by a plurality of photographing apparatuses 121_2 to 121_K that photograph different photographing regions is acquired, the flow line analysis engine can also acquire a flow line that straddles a plurality of images acquired by photographing different photographing regions.

In addition, the engines of (1) to (9) can acquire reliability of the feature values acquired by the engines.

Note that each of the engines (1) to (9) may use the result of analysis performed by another engine as appropriate. The video analysis apparatus 100 may include an analysis unit having a function of the analysis apparatus 122.

The analysis storage unit 124 is a storage unit for storing various kinds of information such as the image information 124*a* and the analysis information 124*b*.

Figure 5:
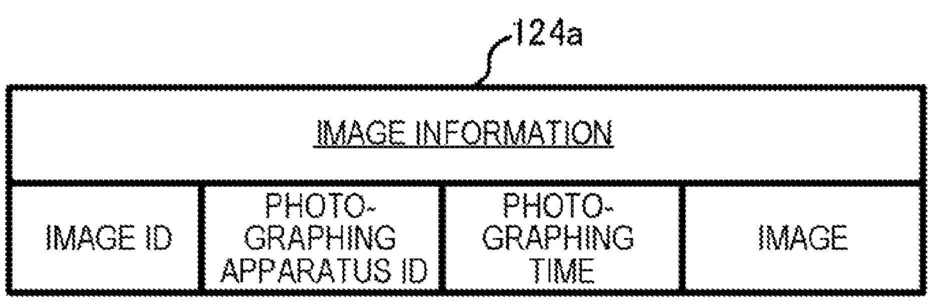
FIG. 5 is a diagram illustrating a configuration example of image information.

The image information 124*a* is information indicating each of a plurality of images. FIG. 5 is a diagram illustrating a configuration example of the image information 124*a*. The image information 124*a* associates, for example, an image ID, a photographing apparatus ID, a photographing time, and an image.

The image ID is information (image identification information) for identifying each of the images constituting the video. The photographing apparatus ID is information (photographing identification information) for identifying each of the photographing apparatuses 121_1 to 121_K. The photographing time is information indicating a time at which an image is photographed. The photographing time includes, for example, a date and a time.

In the image information 124*a*, an image ID and an image identified by using the image ID are associated with each other. In the image information 124*a*, a photographing apparatus ID for identifying the photographing apparatuses 121_1 to 121_K that photograph the image identified by using the image ID and a photographing time indicating a time at which the image indicated by the image ID is photographed are associated with each other.

FIG. 6 is a diagram illustrating a configuration example of the analysis information 124*b*. The analysis information 124*b* associates the image ID, the photographing apparatus ID, the photographing time, and an analysis result.

The image ID, the photographing apparatus ID, and the photographing time, which are associated in the analysis information 124*b*, are the same as the image ID, the photographing apparatus ID, and the photographing time, which are associated in the image information 124*a*, respectively.

The analysis result is information indicating a result of analyzing the image identified by using the image ID associated with the analysis result. In the analysis information 124*b*, an image ID for identifying an image to be analyzed in order to acquire the analysis result is associated with the analysis result.

The analysis result associates, for example, a person ID and a position.

The person ID is information (person identification information) for identifying a person detected from an image. In the analysis information 124*b*, the person ID is information for identifying a person included in the image identified by using the image ID associated with the person ID. The person ID is information for identifying each of the images associated to the person detected from each of a plurality of images regardless of whether or not the detection target is the same person as another.

Note that the person ID may be information for identifying each of persons indicated by the image associated to the person detected from each of the plurality of images. In this case, the person ID becomes the same person ID when the detection target is the same person as another, and becomes a different person ID when the detection target is a different person from another.

The position is information indicating a position of a person. The position of the person is represented, for example, by means of a position in the image. Note that the position may be represented by using a position in the real space. In the analysis information 124*b*, the position indicates a position of a person identified by using the person ID associated therewith.

The appearance attribute indicates an appearance attribute of a person. In the analysis information 124*b*, the appearance attribute indicates an appearance attribute of the person identified by using the person ID associated therewith.

(Function of Video Analysis Apparatus 100)

Figure 7:
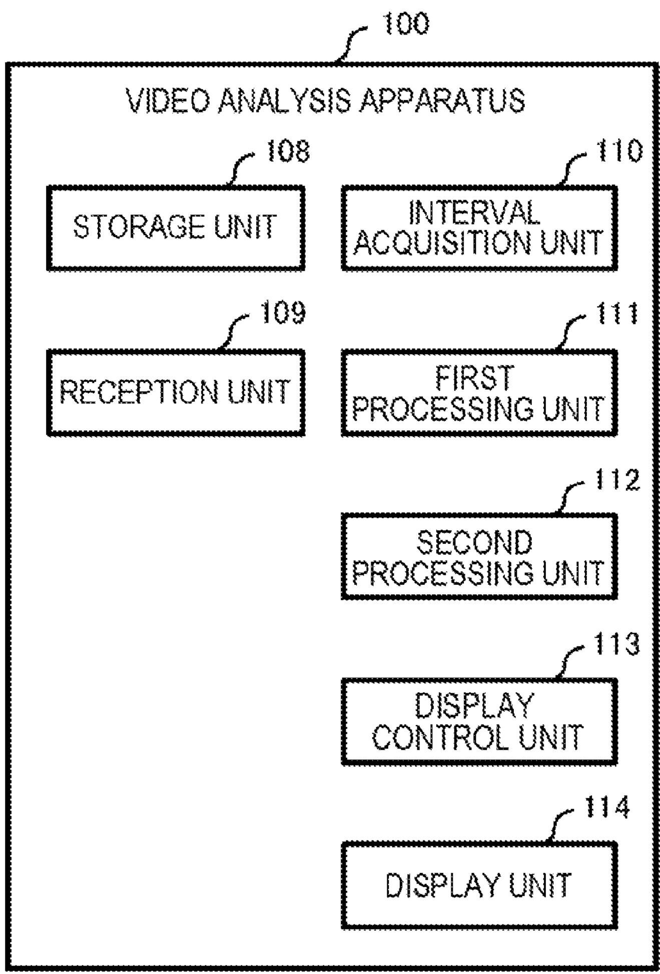
FIG. 7 is a diagram illustrating a detailed example of a functional configuration of the video analysis apparatus according to the first example embodiment.

FIG. 7 is a diagram illustrating a detailed example of a functional configuration of the video analysis apparatus 100 according to the present example embodiment. The video analysis apparatus 100 includes a storage unit 108, a reception unit 109, an interval acquisition unit 110, a first processing unit 111, a second processing unit 112, a display control unit 113, and a display unit 114. Note that the video analysis apparatus 100 may include the analysis unit 123, and in this case, the video analysis system 120 may not include the analysis apparatus 122.

The storage unit 108 is a storage unit for storing various kinds of information.

The reception unit 109 receives various kinds of information such as the image information 124*a* and the analysis information 124*b* from the analysis apparatus 122 via the communication network N. The reception unit 109 may receive the image information 124*a* and the analysis information 124*b* from the analysis apparatus 122 in real time, or may receive the information as necessary in a case of using for processing in the video analysis apparatus 100, or the like.

The reception unit 109 stores the received information in the storage unit 108. Namely, the information stored in the storage unit 108 in the present example embodiment includes the image information 124*a* and the analysis information 124*b*.

Note that the reception unit 109 may receive the image information 124*a* from the photographing apparatuses 121_1 to 121_K via the communication network N, and store the received information in the storage unit 108. In addition, the reception unit 109 may receive the image information 124*a* and the analysis information 124*b* from the analysis apparatus 122 via the communication network N as necessary, in a case of using for processing in the video analysis apparatus 100, or the like. In this case, the image information 124*a* and the analysis information 124*b* may not be stored in the storage unit 108. Further, for example, when the reception unit 109 receives all of the image information 124*a* and the analysis information 124*b* from the analysis apparatus 122 and stores the information in the storage unit 108, the analysis apparatus 122 may not hold the image information 124*a* and the analysis information 124*b*.

Based on the analysis information 124*b*, the interval acquisition unit 110 acquires an interval between persons included in a video acquired by the photographing apparatuses 121_1 to 121_K photographing a target region. Specifically, the interval acquisition unit 110 determines a combination of persons included in each image constituting the video, based on the analysis information 124*b*. The interval acquisition unit 110 acquires an interval between persons by using the position of the analysis information 124*b* for each determined combination.

The first processing unit 111 generates first information relating to the number of persons whose interval acquired by the interval acquisition unit 110 is equal to or less than a reference value. The reference value is a value predetermined with respect to the interval between persons, for example, 1 meter, 2 meters, or the like. The first processing unit 111 holds the reference value in advance, for example, based on an input from the user.

The first information is information relating to the number of persons whose interval is equal to or less than the reference value. The first information may include, for example, at least one of the number of persons whose interval is equal to or less than a reference value, a ratio thereof, and the like among the persons included in each image acquired by photographing an inside of the target region. When acquiring this ratio, the first processing unit 111 acquires, for example, the total number of persons included in each image, and acquires a ratio by dividing the number of persons whose interval is equal to or less than the reference value by the total number.

Based on the analysis information 124*b*, the second processing unit 112 performs statistical processing on the appearance attribute of the person whose interval acquired by the interval acquisition unit 110 is equal to or less than the reference value. Then, the second processing unit 112 generates second information indicating a result of the statistical processing.

The second information is information indicating a result of performing statistical processing on the appearance attribute of the person whose acquired interval is equal to or less than the reference value.

For example, the second information may include at least one of the number of persons according to the appearance attribute, a composition ratio, and the like for a person whose interval is equal to or less than the reference value in each image acquired by photographing the inside of the target region. In a case of acquiring this composition ratio, the second processing unit 112 acquires, for example, the total number of persons included in each image, and acquires a ratio by dividing the number of persons by the appearance attribute of the person whose interval is equal to or less than the reference value by the total number.

Further, for example, the second information may include at least one of an appearance attribute having the largest number of belonging persons, the number of persons who belongs to this appearance attribute, and the like, as for a person whose interval is equal to or less than a reference value in each image acquired by photographing the inside of the target region. Further, for example, the second information may include a list of appearance attributes arranged in descending order of the number of the belonging persons.

The display control unit 113 causes the display unit 114 (for example, a display) to display various kinds of information.

For example, the display control unit 113 causes the display unit 114 to display a time-series transition of the first information generated by the first processing unit 111. Further, for example, the display control unit 113 causes the display unit 114 to display the second information generated by the second processing unit 112.

Further, for example, the display control unit 113 may accept specification of at least one of a display target period and a display target region. When the specification of at least one of the display target period and the display target region is accepted, the display control unit 113 may cause the display unit 114 to display the time-series transition of the first information, the second information, and the like, based on the accepted specification.

When the specification of the display target period is accepted, the display control unit 113 may cause the display unit 114 to display, for example, a time-series transition of the first information based on the video photographed in the display target period, the second information, and the like. When the display target region is accepted, the display control unit 113 may cause the display unit 114 to display, for example, a time-series transition of the first information based on the video associated to the display target period, the second information, and the like.

There are various methods of specifying a display target period and a display target area. The display target period may be specified by a date, a time zone, a combination of a date and a time zone, or the like. The display target area may be specified by using one or more photographing apparatus IDs. In this case, the display control unit 113 may set the photographing regions of the photographing apparatuses 121_1 to 121_K identified by using the specified photographing apparatus ID in the display target region.

Further, the display control unit 113 may cause the display unit 114 to display a video acquired by the photographing apparatuses 121_1 to 121_K photographing the target region. In this case, the display control unit 113 may accept specification of the display target period by accepting the specification of the image associated to each of a start time and an end time of the display target period. The display control unit 113 may accept specification of the display target region by accepting the specification of the region in the image constituting the video.

(Physical Configuration of Video Analysis Apparatus 100)

Figure 8:
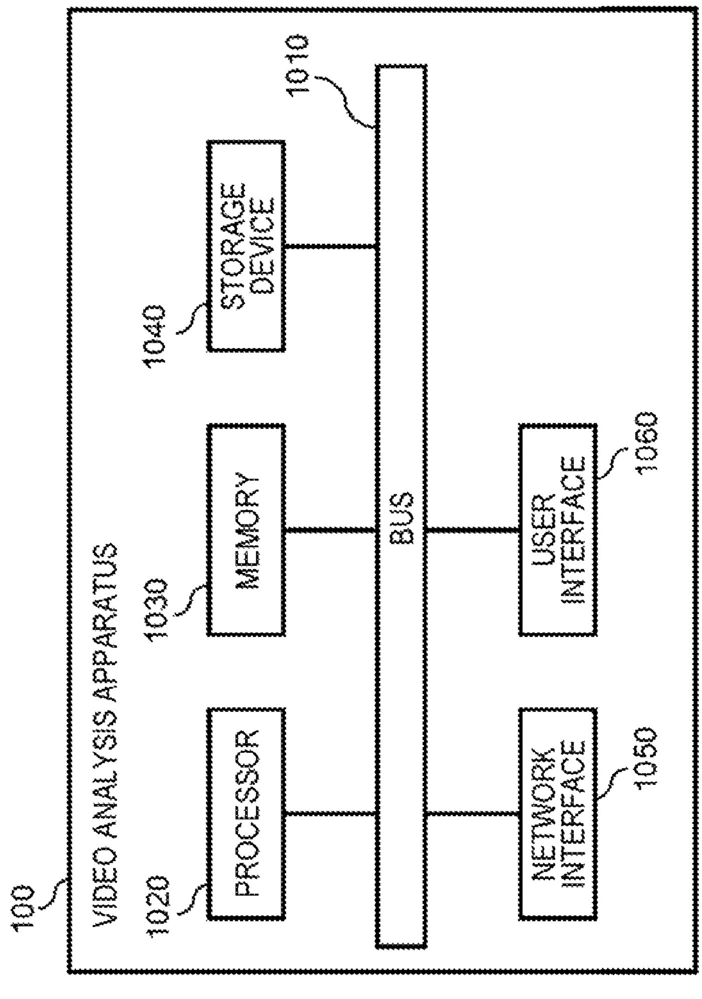
FIG. 8 is a diagram illustrating an example of a physical configuration of the video analysis apparatus according to the first example embodiment.

FIG. 8 is a diagram illustrating an example of a physical configuration of the video analysis apparatus 100 according to the present example embodiment. The video analysis apparatus 100 includes a bus 1010, a processor 1020, a memory 1030, a storage device 1040, a network interface 1050, and a user interface 1060.

The bus 1010 is a data transmission path through which the processor 1020, the memory 1030, the storage device 1040, the network interface 1050, and the user interface 1060 transmit and receive data to and from each other. However, a method of connecting the processors 1020 and the like to each other is not limited to the bus connection.

The processor 1020 is a processor achieved by Central Processing Unit (CPU), Graphics Processing Unit (GPU), or the like.

The memory 1030 is a main storage apparatus achieved by a Random Access Memory (RAM) or the like.

The storage device 1040 is an auxiliary storage apparatus achieved by a Hard Disk Drive (HDD), a Solid State Drive (SSD), a memory card, a Read Only Memory (ROM), or the like. The storage device 1040 stores program modules for achieving the functions of the video analysis apparatus 100. The processor 1020 reads the program modules into the memory 1030 and executes the program modules, thereby achieving functions associated to the program modules.

The network interface 1050 is an interface for connecting the video analysis apparatus 100 to the communication network N.

The user interface 1060 is a touch panel, a keyboard, a mouse, or the like as an interface for the user to input information, and a liquid crystal panel, an organic Electro- Luminescence (EL) panel, or the like as an interface for presenting information to the user.

The analysis apparatus 122 may be physically configured in the same manner as the video analysis apparatus 100 (see FIG. 8).

(Operation of Video Analysis System 120)

The operation of the video analysis system 120 will now be explained with reference to the drawings.

(Analysis Processing)

Figure 9:
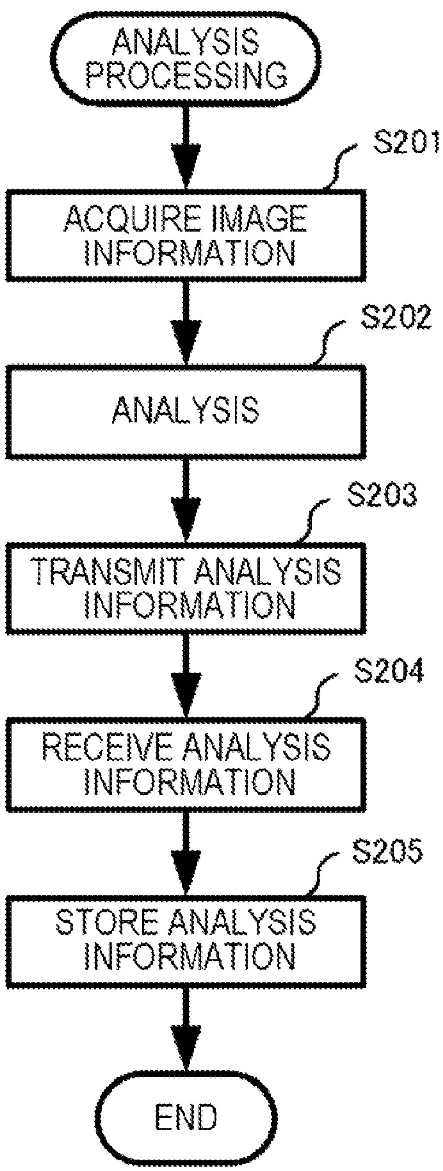
FIG. 9 is a flowchart illustrating an example of analysis processing according to the first example embodiment.

FIG. 9 is a flowchart illustrating an example of analysis processing according to the present example embodiment. The analysis processing is processing for analyzing the image photographed by the photographing apparatuses 121_1 to 121_K. The analysis processing is repeatedly executed, for example, during the operation of the photographing apparatuses 121_1 to 121_K and the analysis unit 123.

The analysis unit 123 acquires the image information 124*a* from each of the photographing apparatuses 121_1 to 121_K, for example, in real time via the communication network N (step S201).

The analysis unit 123 causes the analysis storage unit 124 to store the image information 124*a* acquired in step S201, and analyzes the image included in the image information 124*a* (step S202). Accordingly, the analysis unit 123 generates the analysis information 124*b*.

The analysis unit 123 stores the analysis information 124*b* generated by performing the analysis in step S202 in the analysis storage unit 124, and transmits the analysis information to the video analysis apparatus 100 via the communication network N (step S203). At this time, the analysis unit 123 may transmit the image information 124*a* acquired in step S201 to the video analysis apparatus 100 via the communication network N.

The reception unit 109 receives the analysis information 124*b* transmitted in step S203 via the communication network N (step S204). At this time, the reception unit 109 may receive the image information 124*a* transmitted in step S203 via the communication network N.

The reception unit 109 stores the analysis information 124*b* received in step S204 in the storage unit 108 (step S205), and ends the analysis processing. At this time, the reception unit 109 may receive the image information 124*a* received in step S204 via the communication network N.

(Video Analysis Processing)

As described with reference to FIG. 3, video analysis processing is processing for analyzing an interval between persons included in a video by using a result of analyzing an image, and utilizing the result. The video analysis processing is started, for example, when the user logs in, and the display control unit 113 causes the display unit 114 to display a processing target specification screen 131. The processing target specification screen 131 is a screen for accepting specification of a user.

Figure 10:
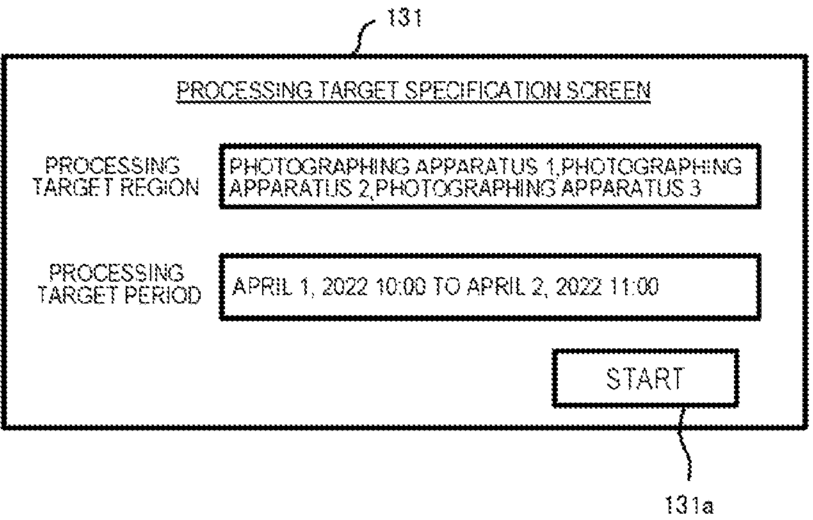
FIG. 10 is a diagram illustrating an example of a processing target specification screen according to the first example embodiment.

FIG. 10 is a diagram illustrating an example of the processing target specification screen 131 according to the present example embodiment. The processing target specification screen 131 illustrated in FIG. 10 is a screen for specifying a processing target region and a processing target period.

The processing target region and the processing target period are a region and a time to be processed by the interval acquisition unit 110 for acquiring an interval between persons. The processing target region is specified by using, for example, one or more photographing apparatus IDs. In this case, photographing regions of the photographing apparatuses 121_1 to 121_K identified by using the specified photographing apparatus ID are set in the processing target region.

The processing target specification screen 131 includes an input field associated to each of the processing target region and the processing target period. For example, the user specifies a processing target region and a processing target period by inputting them in each input field.

FIG. 10 illustrates an example in which three photographing apparatus IDs "photographing apparatus 1", "photographing apparatus 2", and "photographing apparatus 3" are specified by using an input field associated with the "processing target region". FIG. 10 illustrates an example in which a processing target period is specified with "Apr. 1, 2022 10:00" as a start time, and "Apr. 1, 2022 11:00" as an end time, by using an input field associated with the "processing target period".

Figure 11:
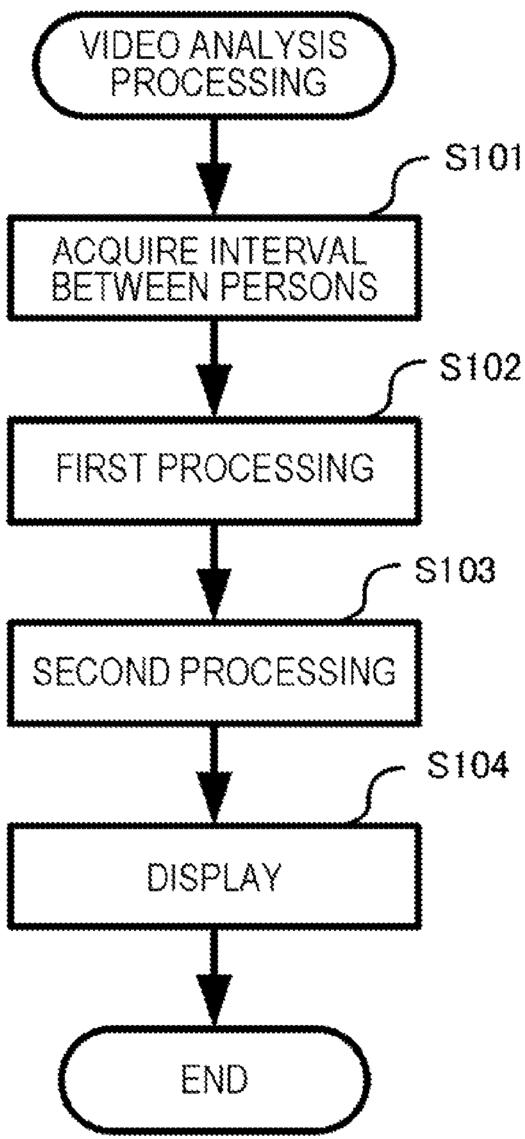
FIG. 11 is a flowchart illustrating a detailed example of the video analysis processing according to the first example embodiment.

For example, when the user presses a start button 131*a*, the video analysis apparatus 100 starts video analysis processing illustrated in FIG. 11.

FIG. 11 is a flowchart illustrating a detailed example of the video analysis processing according to the present example embodiment.

The interval acquisition unit 110 acquires an interval between persons included in a video acquired by the photographing apparatuses 121_1 to 121_K photographing a target region, for example, based on the analysis information 124*b* stored in the storage unit 108 (step S101).

Specifically, the interval acquisition unit 110 determines all combinations of two persons for each person included in the image. Then, the interval acquisition unit 110 acquires the interval between the persons by using the position of the analysis information 124*b* for each determined combination.

Figure 12:
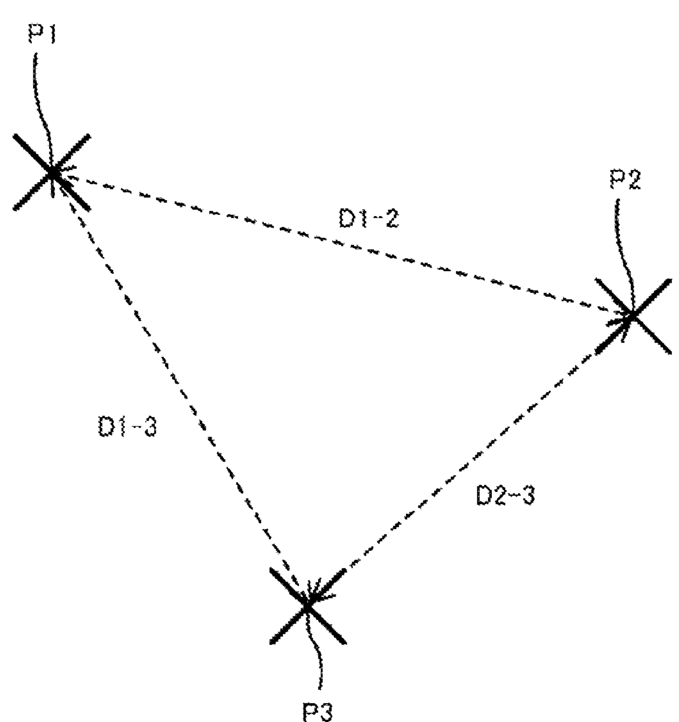
FIG. 12 is a diagram illustrating an example of an interval between persons.

FIG. 12 is a diagram illustrating an example of an interval between persons. It is assumed that the analysis information 124*b* includes persons with person IDs "P1", "P2", and "P3". In this case, the interval acquisition unit 110 determines a combination of the person IDs "P1" and "P2", a combination of the person IDs "P1" and "P3", and a combination of the person IDs "P2" and "P3" as all the combinations.

Then, the interval acquisition unit 110 acquires an interval D1-2 for the combination of the person IDs "P1" and "P2", based on the positions associated with these person IDs. The interval acquisition unit 110 acquires an interval D1-3 for the combination of the person IDs "P1" and "P3", based on the positions associated with these person IDs. The interval acquisition unit 110 acquires an interval D2-3 for the combination of the person IDs "P2" and "P3", based on the positions associated with the person IDs.

Refer again to FIG. 11.

The first processing unit 111 generates first information relating to the number of persons whose interval is equal to or less than a reference value, based on the interval acquired in step S101 (step S102).

Based on the analysis information 124*b*, the second processing unit 112 performs statistical processing on an appearance attribute of the person whose interval acquired by the interval acquisition unit 110 is equal to or less than the reference value, and generates second information indicating a result of the statistical processing (step S103).

Specifically, for example, the second processing unit 112 acquires the person ID of the person whose interval acquired in step S101 is equal to or less than the reference value and appearance information associated with the person ID. The second processing unit 112 performs statistical processing on the appearance attribute of the person whose interval is equal to or less than the reference value, based on the acquired person ID and appearance information.

For example, the display control unit 113 causes the display unit 114 to display at least one of the first information generated in step S102 and the second information generated in step S103 (step S104).

Specifically, for example, the display control unit 113 receives a specification of a unit time for displaying a time-series transition of the first information. Upon receiving the specification of the unit time, the display control unit 113 causes the display unit 114 to display information indicating the time-series transition of the first information at time intervals according to the accepted unit time.

Figure 13:
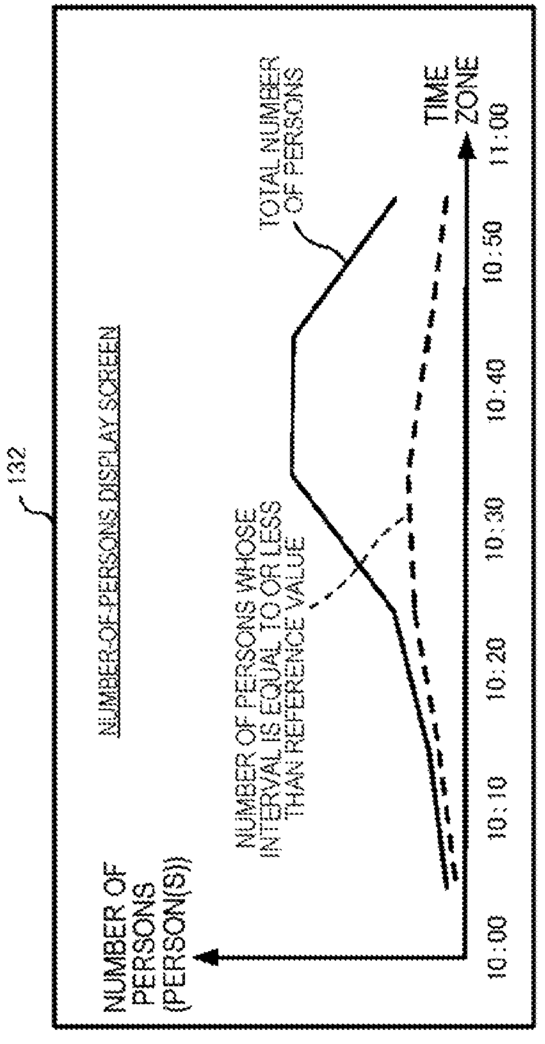
FIG. 13 is a diagram illustrating an example of a number-of-persons display screen according to the first example embodiment.

FIG. 13 is a diagram illustrating an example of a number-of-persons display screen 132. The number-of-persons display screen 132 is an example of a screen for displaying the first information on the display unit 114. The number-of-persons display screen 132 illustrated in FIG. 13 is an example in which the total number of persons included in the image and the number of persons whose interval is equal to or less than the reference value are indicated by a line graph with the unit time being 10 minutes. The time-series transition of the first information is not limited to the line graph, and may be indicated by a bar graph or the like.

Figure 14:
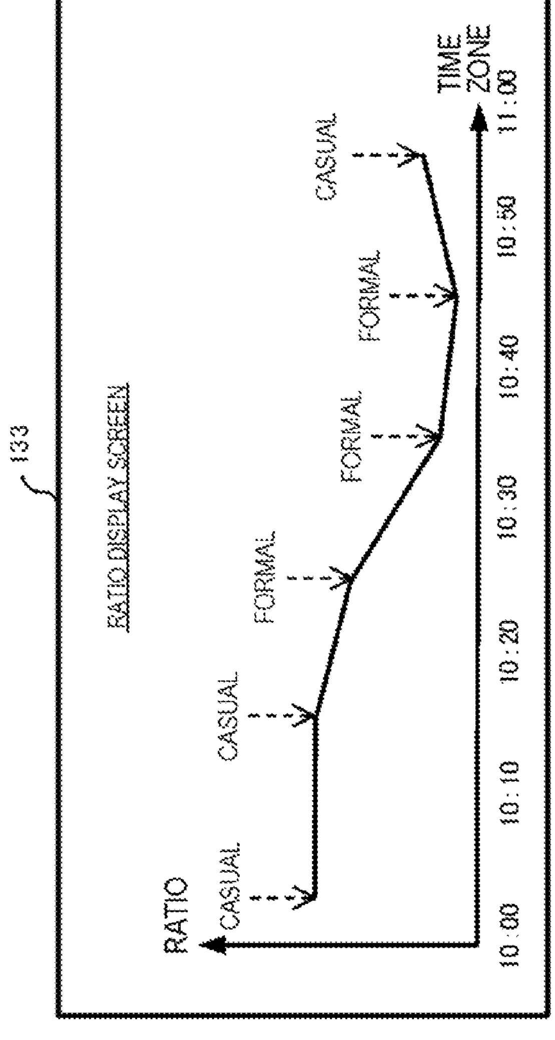
FIG. 14 is a diagram illustrating an example of a ratio display screen according to the first example embodiment.

FIG. 14 is a diagram illustrating an example of a ratio display screen 133. The ratio display screen 133 is another example of a screen for displaying the first information on the display unit 114. The ratio display screen 133 illustrated in FIG. 14 is an example in which the unit time is set to 10 minutes and the ratio of the persons whose interval is equal to or less than the reference value is indicated by a line graph. The time-series transition of the first information is not limited to the line graph, and may be indicated by a bar graph or the like.

Further, the ratio display screen 133 illustrated in FIG. 14 includes the second information of each time zone together with the ratio of the persons whose interval is equal to or less than the reference value. The second information illustrated in FIG. 14 is an appearance attribute having the largest number of belonging persons. In FIG. 14, the second information associated with a time period of, for example, 10:00 to 10:10 indicates that the appearance attribute having the largest number of belonging persons is "casual" clothing.

Note that the display control unit 113 may determine a mode of the screen to be displayed on the display unit 114 (for example, the number-of-persons display screen 132 or the ratio display screen 133), based on, for example, the specification of the user.

Action and Effect

As described above, according to the present example embodiment, the video analysis apparatus 100 includes the interval acquisition unit 110 and the display control unit 113. The interval acquisition unit 110 acquires an interval between persons included in a video acquired by photographing a target region. The display control unit 113 causes the display unit 114 to display a time-series transition of first information relating to the number of persons whose acquired interval is equal to or less than the reference value.

As a result, the user can view the time-series transition of the first information relating to the number of persons whose interval is equal to or less than the reference value as for the persons included in the video. Therefore, it is possible to utilize a result of analyzing the interval between persons included in the image.

According to the present example embodiment, the first information includes at least one of a ratio of persons whose interval is equal to or less than the reference value, and the number of persons whose interval is equal to or less than the reference value.

In this way, the user can view at least one time-series transition of the ratio of persons whose interval is equal to or less than the reference value and the number of persons whose interval is equal to or less than the reference value. Therefore, it is possible to utilize the result of analyzing the interval between persons included in the image.

According to the present example embodiment, the display control unit 113 further causes the display unit 114 to display second information indicating a result of performing statistical processing on an appearance attribute of the person whose acquired interval between persons is equal to or less than the reference value.

As a result, the user can view the second information indicating the result of performing the statistical processing on the appearance attribute of the person whose interval is equal to or less than the reference value as for the persons included in the video. Therefore, it is possible to utilize the result of analyzing the interval between persons included in the image.

According to the present example embodiment, when the specification of at least one of the display target period and the display target region is accepted, the display control unit 113 causes the display unit 114 to display the time-series transition of the first information, based on the accepted specification.

As a result, the user can view the time-series transition of the first information relating to the number of persons whose interval is equal to or less than the reference value as for the persons included in the video associated to at least one of a desired display target period and a desired display target region. Therefore, it is possible to utilize the result of analyzing the interval between persons included in the image.

According to the present example embodiment, when the specification of the unit time for displaying the time-series transition is accepted, the display control unit 113 causes the display unit 114 to display information indicating the time-series transition of the first information at a time interval according to the unit time.

Thus, the user can view the time-series transition of the first information at time intervals according to the unit time. Therefore, it is possible to utilize the result of analyzing the interval between persons included in the image.

Second Example Embodiment

In the first example embodiment, an example has been explained in which the time-series transition of the first information or the like is displayed on the display unit 114, based on the interval between persons included in the video. The method of utilizing the result of analyzing the interval between persons included in the video is not limited to this. In the second example embodiment, an example will be explained in which a dense level of persons is displayed on the display unit 114, based on the interval between the persons included in a video. In the present example embodiment, in order to simplify the explanation, difference points from the first example embodiment will be mainly explained, and the explanation that overlaps with the first example embodiment will be appropriately omitted.

Figure 15:
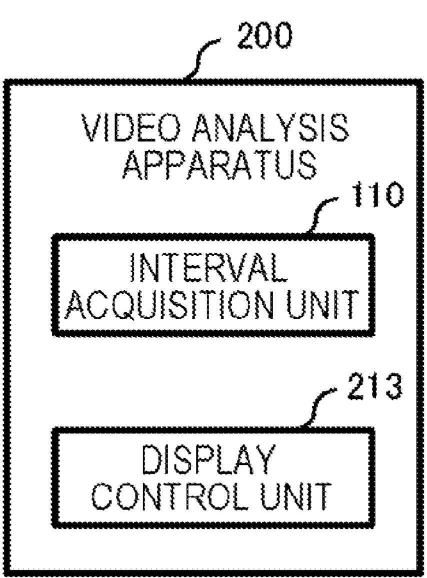
FIG. 15 is a diagram illustrating an outline of a video analysis apparatus according to a second example embodiment.

FIG. 15 is a diagram illustrating an outline of a video analysis apparatus 200 according to the second example embodiment. The video analysis apparatus 200 includes an interval acquisition unit 110 similar to that of the first example embodiment, and a display control unit 213 instead of the display control unit 113 according to the first example embodiment.

The display control unit 213 causes the display unit to display third information indicating the dense level of the persons acquired based on the acquired interval in at least three stages in a superimposed manner on an image indicating a target region.

According to the video analysis apparatus 200, it is possible to utilize a result of analyzing the interval between persons included in the video.

Figure 16:
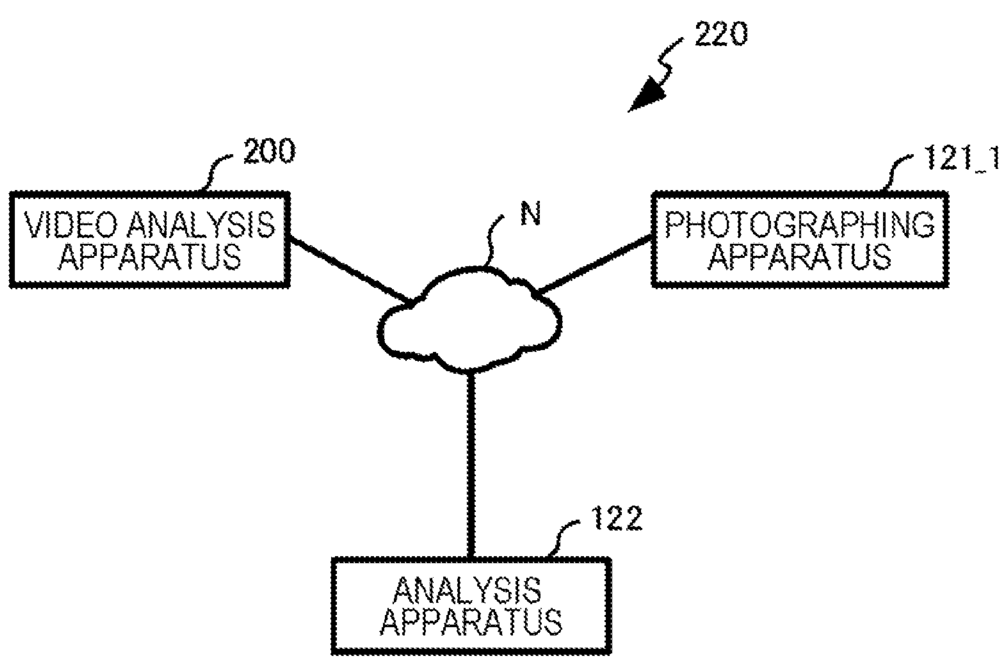
FIG. 16 is a diagram illustrating an outline of a video analysis system according to the second example embodiment.

FIG. 16 is a diagram illustrating an outline of a video analysis system 220 according to the second example embodiment. The video analysis system 220 includes a video analysis apparatus 200 instead of the video analysis apparatus 100 according to the first example embodiment, and at least one photographing apparatus 121_1 and one analysis apparatus 122 similar to the first example embodiment.

According to the video analysis system 220, it is possible to utilize the result of analyzing the interval between persons included in the video.

Figure 17:
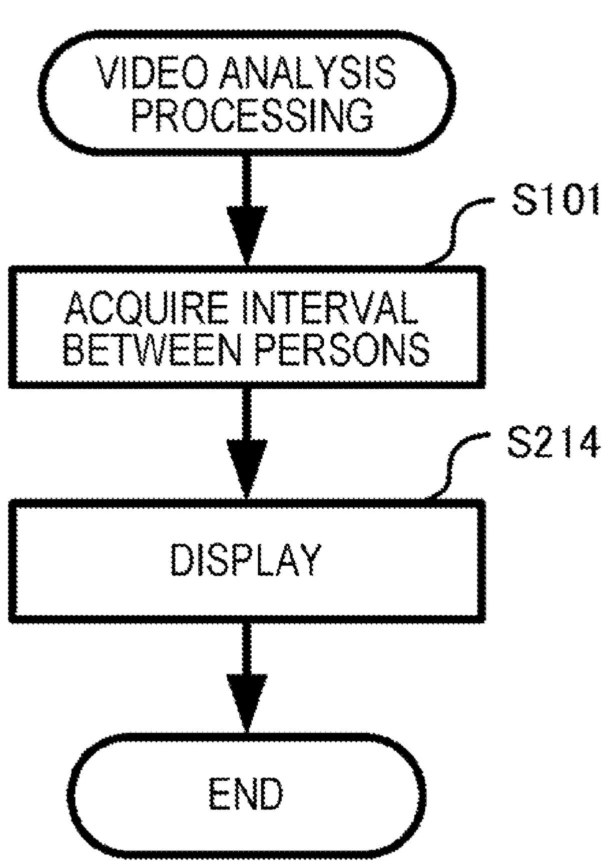
FIG. 17 is a flowchart illustrating an example of video analysis processing according to the second example embodiment.

FIG. 17 is a flowchart illustrating an example of video analysis processing according to the second example embodiment. The video analysis processing according to the present example embodiment includes the same step S101 as in the first example embodiment, and a step S214 instead of the step S104 according to the first example embodiment.

In step S214, the display control unit 213 causes the display unit to display the third information indicating the dense level of the persons acquired based on the acquired interval in at least three stages in a superimposed manner on the image indicating the target region.

According to the video analysis processing, it is possible to utilize the result of analyzing the interval between persons included in the video.

Hereinafter, a detailed example of the video analysis system 220 according to the second example embodiment will be explained.

Figure 18:
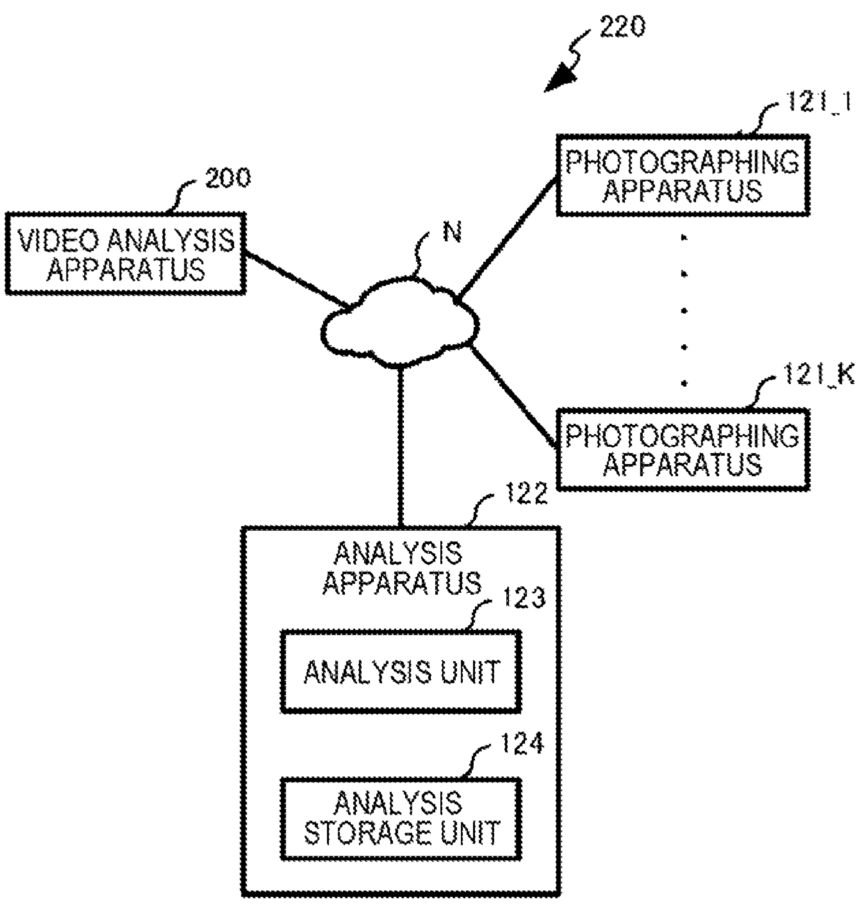
FIG. 18 is a diagram illustrating a detailed example of a configuration of the video analysis system according to the second example embodiment.

FIG. 18 is a diagram illustrating a detailed example of a configuration of the video analysis system 220 according to the present example embodiment.

Specifically, the video analysis system 220 includes a video analysis apparatus 200 instead of the video analysis apparatus 100 according to the first example embodiment, and photographing apparatuses 121_1 to 121_K and an analysis apparatus 122 similar to the first example embodiment.

(Function of Video Analysis Apparatus 200)

Figure 19:
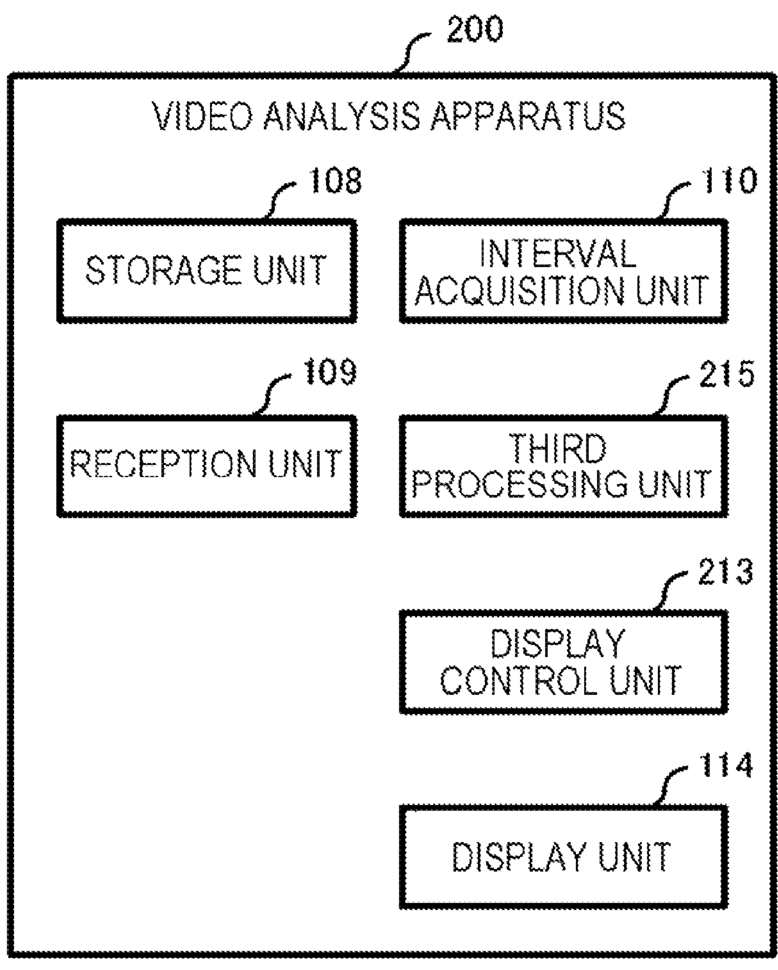
FIG. 19 is a diagram illustrating a detailed example of a functional configuration of the video analysis apparatus according to the second example embodiment.

FIG. 19 is a diagram illustrating a detailed example of a functional configuration of the video analysis apparatus 200 according to the present example embodiment. The video analysis apparatus 200 includes a storage unit 108, a reception unit 109, an interval acquisition unit 110, and a display unit 114 similar to those in the first example embodiment. The video analysis apparatus 200 further includes a third processing unit 215 in place of the first processing unit 111 and the second processing unit 112 according to the first example embodiment, and a display control unit 213 in place of the display control unit 113 according to the first example embodiment.

The third processing unit 215 generates third information acquired based on the interval between persons acquired by the interval acquisition unit 110. The third information is information indicating the dense level of the persons in at least three stages.

Specifically, for example, the third processing unit 215 determines, for each segment acquired by dividing the target region by a predetermined method, the number of persons whose interval acquired by the interval acquisition unit 110 is equal to or less than the reference value. The third processing unit 215 determines a dense level of each segment, based on a predetermined criterion and the number of persons whose interval for each segment is equal to or less than the reference value. The third processing unit 215 generates third information, based on the determined dense level. The third processing unit 215 may further generate the third information, based on the analysis information 124*b*. The third processing unit 215 may store the generated third information in the storage unit 108.

FIG. 20 is a diagram illustrating a configuration example of third information according to the present example embodiment. The third information is information associating image information similar to the analysis information 124*b* with dense information acquired based on the image information.

The dense information is information about a dense region. The dense information associates a dense region ID (dense region identification information) for identifying a dense region, a person ID of a person in the dense region, an appearance attribute of a person in the dense region, and a dense level associated to the dense region.

Refer again to FIG. 19.

As in the first example embodiment, the display control unit 213 causes the display unit 114 (for example, a display) to display various kinds of information. The display control unit 213 according to the present example embodiment causes the display unit 114 to display the third information generated by the third processing unit 215 in a superimposed manner on the image indicating the target region.

Note that, similarly to the display control unit 113 according to the first example embodiment, when the specification of at least one of the display target period and the display target region is accepted, the display control unit 213 may cause the display unit 114 to display the time-series transition of the third information, based on the accepted specification. In addition, when the specification of the unit time for displaying the time-series transition is accepted, the display control unit 213 may cause the display unit 114 to display information indicating the time-series transition of the third information at time intervals according to the unit time.

The image analysis apparatus 200 may be physically configured in the same manner as the video analysis apparatus 100 according to the first example embodiment (see FIG. 8).

(Operation of Video Analysis System 220)

The video analysis system 220 executes analysis processing similar to that of the first example embodiment and video analysis processing different from that of the first example embodiment.

Figure 21:
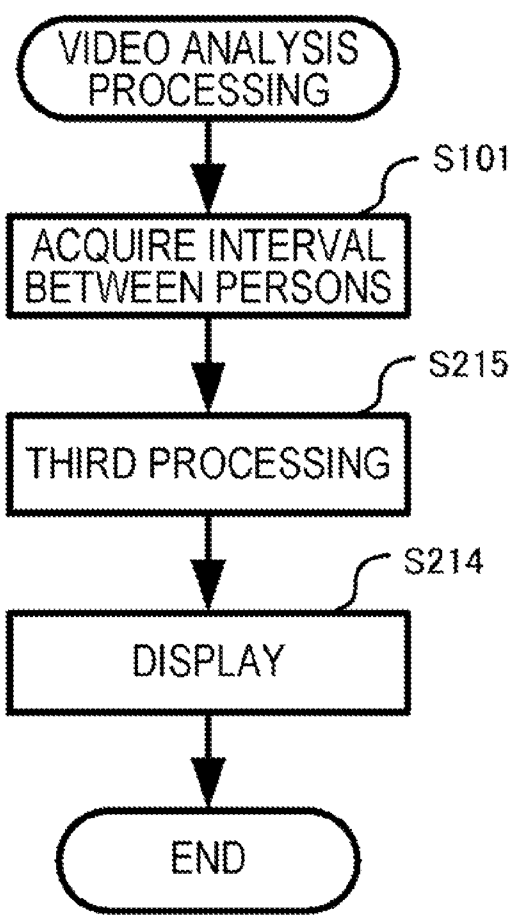
FIG. 21 is a flowchart illustrating a detailed example of the video analysis processing according to the second example embodiment.

FIG. 21 is a flowchart illustrating a detailed example of the video analysis processing according to the present example embodiment. The video analysis processing may be started by, for example, accepting the specification of the processing target region and the processing target period on the processing target specification screen 131 (see FIG. 11) similar to that in the first example embodiment, and the user pressing a start button 131*a*.

The video analysis processing according to the present example embodiment includes the same step S101 as in the first example embodiment, a step S215 instead of the steps S102 to S103 according to the first example embodiment, and a step S214 instead of the step S104 according to the first example embodiment.

In step S215, the third processing unit 215 generates the third information, based on the interval between the persons acquired by the interval acquisition unit 110 and the analysis information 124*b*.

Specifically, for example, as described above, the third processing unit 215 determines the dense level of each segment, based on a predetermined criterion and the number of persons whose interval for each segment is equal to or less than the reference value, and generates the third information.

Note that the method of generating the third information is not limited to this.

For example, the third processing unit 215 may determine a person whose interval between persons acquired by the interval acquisition unit 110 is equal to or less than the reference value. In this case, the third processing unit 215 may determine, based on the analysis information 124*b*, a person region that is a circular region centered on the position of each person whose interval is equal to or less than the reference value and whose radius is the reference value.

Then, the third processing unit 215 may integrate, when there are person regions at least partially overlapping each other, the overlapping person regions. As a result, the third processing unit 215 can determine a region (dense region) in which a person whose interval acquired by the interval acquisition unit 110 is equal to or less than the reference value exists.

The third processing unit 215 determines a density of the person in the dense region (a unit is [person/square meter], for example). The third processing unit 215 may determine a dense level associated to the dense region, based on the predetermined reference and density.

In step S214, for example, the display control unit 213 causes the display unit 114 to display the third information generated in step S215 together with the image on which the third information is generated.

Figure 22:
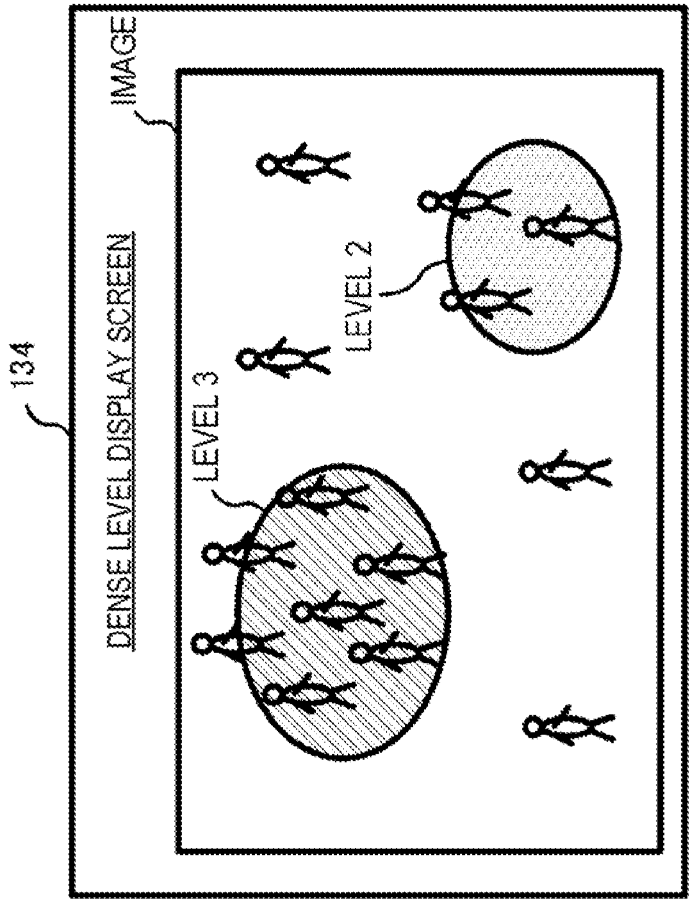
FIG. 22 is a diagram illustrating an example of a dense level display screen according to the second example embodiment.

FIG. 22 is a diagram illustrating an example of a dense level display screen 134. The dense level display screen 134 is a screen for causing the display unit 114 to display the dense level together with the image. The dense level display screen 134 illustrated in FIG. 22 is an example of a screen in which dense regions equivalent to levels 2 and 3 are detected among the three dense levels, and the dense regions of levels 2 and 3 are displayed together with an image.

The dense regions of different dense levels may be displayed in different manners. In the example of FIG. 22, the level 2 dense regions are dotted, and the level 3 dense regions are hatched. Note that the mode for displaying dense regions of different dense levels is not limited to patterns such as hatching and dots, and may include color, color density, and the like.

In FIG. 22, in the dense level display screen 134, images constituting a video may be displayed in time series. Then, the display control unit 213 may cause the display unit 114 to display the dense level display screen 134 including the third information associated to the image being displayed together with the images. As a result, it is possible to cause the display unit 114 to display the information indicating the time-series transition of the third information.

Action and Effect

As described above, according to the present example embodiment, the video analysis apparatus 200 includes the interval acquisition unit 110 and the display control unit 213. The display control unit 213 causes the display unit 114 to display the third information indicating the dense level of the person acquired based on the acquired interval in at least three stages, by superimposing the third information on the image indicating the target region.

Accordingly, the user can view the third information indicating the dense level of the person, which is acquired based on the interval between the persons included in the video, in at least three stages, together with the image indicating the target region. Therefore, it is possible to utilize the result of analyzing the interval between persons included in the image.

According to the present example embodiment, when the specification of at least one of the display target period and the display target region is accepted, the display control unit 213 causes the display unit 114 to display a time-series transition of the third information, based on the accepted designation.

As a result, the user can view the third information acquired based on the interval between the persons included in the video associated to at least one of the desired display target period and display target region, together with the image indicating the target region. Therefore, it is possible to utilize the result of analyzing the interval between persons included in the image.

According to the present example embodiment, when the specification of the unit time for displaying the time-series transition is accepted, the display control unit 213 causes the display unit 114 to display information indicating the time-series transition of the third information at a time interval according to the unit time.

Accordingly, the user can view the third information at time intervals according to the unit time. Therefore, it is possible to utilize the result of analyzing the interval between persons included in the image.

Modified Example 1

Figure 23:
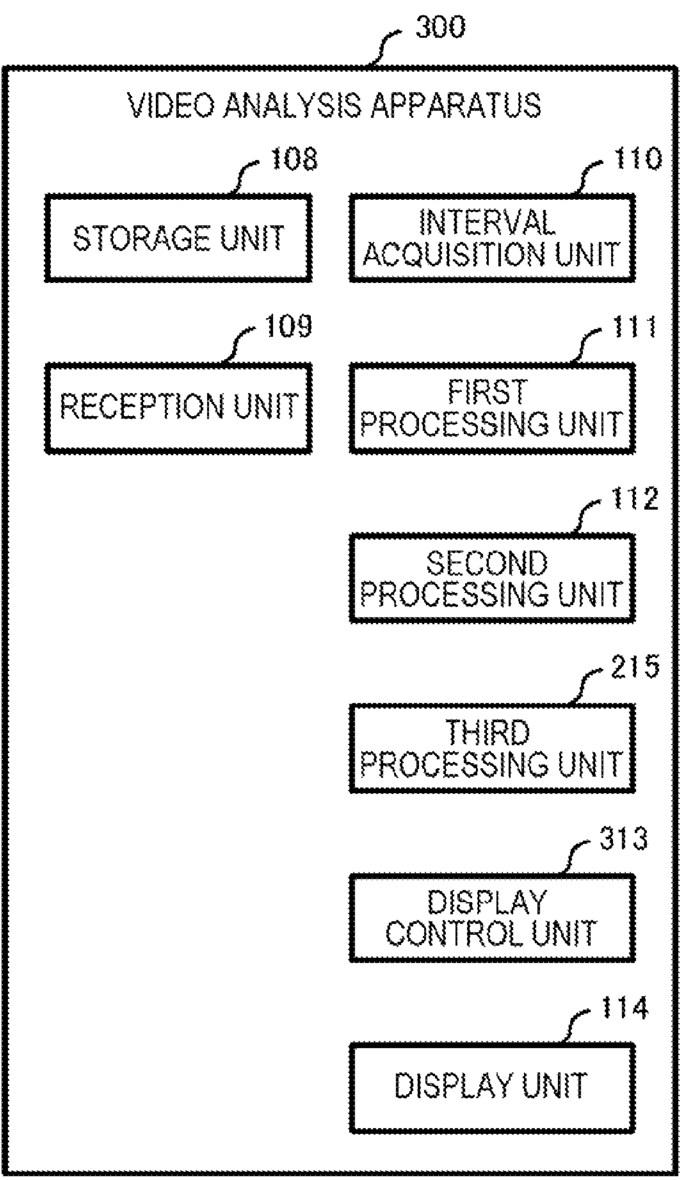
FIG. 23 is a diagram illustrating an example of a functional configuration of a video analysis apparatus according to a modified example 1.

The video analysis apparatus may include the first processing unit 111 and the second processing unit 112 according to the first example embodiment, and the third processing unit 215 according to the second example embodiment. FIG. 23 is a diagram illustrating an example of a functional configuration of a video analysis apparatus 300 according to the present modified example. The video analysis apparatus 300 includes a third processing unit 215 in addition to the functional configuration of the video analysis apparatus 100 according to the first example embodiment, and a display control unit 313 in place of the display control unit 113. For example, the display control unit 313 causes the display unit 114 to display at least one of the first information, the second information, and the third information in accordance with an instruction from the user.

According to the modified example 1, the user can view at least one of the first information, the second information, and the third information. Therefore, it is possible to utilize the result of analyzing the interval between persons included in the image.

The example embodiments and the modified example of the present invention have been described above with reference to the drawings, but these are examples of the present invention, and various configurations other than the above may be adopted.

Further, in the plurality of flowcharts used in the above explanation, a plurality of steps (processing) are described in order, but the execution order of the steps to be executed in the example embodiment is not limited to the order described. In the example embodiment, the order of the steps illustrated can be changed within a range where there is no problem in terms of content. Further, the above-described example embodiments and modified example can be combined within a range where the contents do not conflict with each other.

Some or all of the above-described example embodiments may be described as the following supplementary notes, but are not limited thereto.

1. A video analysis apparatus including:
   an interval acquisition means for acquiring an interval between persons included in a video acquired by photographing a target region;
   a display control means for causing a display means to display a time-series transition of first information relating to the number of persons with the acquired interval being equal to or less than a reference value.
2. The video analysis apparatus according to 1., wherein the first information includes at least one of a ratio of persons with the interval being equal to or less than a reference value, and the number of persons with the interval being equal to or less than a reference value.
3. The video analysis apparatus according to 1. or 2., wherein
   the display control means further causes the display means to display second information indicating a result of performing statistical processing on an appearance attribute of a person with the acquired interval between persons being equal to or less than a reference value.
4. The video analysis apparatus according to 1. to 3., wherein
   the display control means causes, when accepting specification of at least one of a display target period and a display target region, the display means to display a time-series transition of the first information, based on the accepted specification.
5. The video analysis apparatus according to any one of 1. to 4., wherein
   the display control means causes, when accepting specification of a unit time for displaying the time-series transition, the display means to display information indicating a time-series transition of the first information at a time interval according to the unit time.
6. A video analysis apparatus including:
   an interval acquisition means for acquiring an interval between persons included in a video acquired by photographing a target region;
   a display control means for causing a display means to display third information indicating a dense level of the persons in at least three stages by superimposing the third information on an image indicating the target region, the third information being acquired based on the acquired interval.
7. The video analysis apparatus according to 6., wherein the display control means causes, when accepting specification of at least one of a display target period and a display target region, the display means to display a time-series transition of the third information, based on the accepted specification.
8. The video analysis apparatus according to 6. or 7., wherein
   the display control means causes, when accepting specification of a unit time for displaying a time-series transition, the display means to display information indicating a time-series transition of the third information at a time interval according to the unit time.
9. A video analysis system including:
   the video analysis apparatus according to any one of the above 1. to 8.;
   at least one photographing apparatus that generates the video by photographing the target region; and
   an analysis apparatus that analyzes the video and detects a person included in the video, and acquires a position of the person.
10. A video analysis method including, by a computer:
   acquiring an interval between persons included in a video acquired by photographing a target region; and
   causing a display means to display a time-series transition of first information relating to the number of persons with the acquired interval being equal to or less than a reference value.
11. A program for causing a computer to execute:
   acquiring an interval between persons included in a video acquired by photographing a target region; and
   causing a display means to display a time-series transition of first information relating to the number of persons with the acquired interval being equal to or less than a reference value.
12. A storage medium having recorded thereon a program for causing a computer to execute:
   acquiring an interval between persons included in a video acquired by photographing a target region; and
   causing a display means to display a time-series transition of first information relating to the number of persons with the acquired interval being equal to or less than a reference value.
13. A video analysis method including, by a computer:
   acquiring an interval between persons included in a video acquired by photographing a target region; and
   causing a display means to display third information indicating a dense level of the persons in at least 3 stages by superimposing the third information on an image indicating the target region, the third information being acquired based on the acquired interval.
14. A program for causing a computer to execute:
   acquiring an interval between persons included in a video acquired by photographing a target region; and
   causing a display means to display third information indicating a dense level of the persons in at least three stages by superimposing the third information on an image indicating the target region, the third information being acquired based on the acquired interval.
15. A storage medium having recorded thereon a program for causing a computer to execute:
   acquiring an interval between persons included in a video acquired by photographing a target region; and
   causing a display means to display third information indicating a dense level of the persons in at least three stages by superimposing the third information on an image indicating the target region, the third information being acquired based on the acquired interval.

What is claimed is:

1. A video analysis apparatus comprising:

a memory configured to store instructions; and at least one processor configured to execute the instructions to:

acquire an interval between persons included in a video acquired by photographing a target region;

cause a display to display a time-series transition of first information relating to a number of persons with the acquired interval being equal to or less than a reference value, and cause the display to further display second information indicating a result of performing statistical processing on an appearance attribute of a person with the acquired interval being equal to or less than the reference value, wherein the second information comprises:

a number of persons according to the appearance attribute of the person with the acquired interval being equal to or less than the reference value, a composition ratio according to the appearance attribute of the person with the acquired interval being equal to or less than the reference value, a second appearance attribute having a largest number of belonging persons of persons with the acquired interval being equal to or less than the reference value, a number of persons who belongs to the second appearance attribute, a list of appearance attributes of members belonging to a group of persons whose interval is equal to or less than the reference value, or a list of appearance attributes arranged in descending order of a number the members belonging to the group of persons.

2. The video analysis apparatus according to claim 1, wherein the first information comprises:

a ratio of persons with the acquired interval being equal to or less than the reference value, or the number of persons with the acquired interval being equal to or less than the reference value.

3. The video analysis apparatus according to claim 1, wherein the at least one processor is configured to execute the instructions to:

cause the display, when accepting specification of at least one of a display target period or a display target region, to further display the time-series transition of the first information, based on the accepted specification.

4. A video analysis apparatus comprising:

a memory configured to store instructions; and at least one processor configured to execute the instructions to:

acquire an interval between persons included in a video acquired by photographing a target region;

cause a display to display dense level information indicating a dense level of the persons in at least three stages by superimposing the dense level information on an image indicating the target region, the dense level information being acquired based on the acquired interval;

cause the display to further display dense regions corresponding to different dense levels in different manners from each other; and cause the display to further display a graph simultaneously presenting the dense level information corresponding to each of a plurality of timings within a specific period, the graph indicating a time-series transition of the dense level information.

5. The video analysis apparatus according to claim 4, wherein the at least one processor is configured to execute the instructions to:

cause the display, when accepting specification of at least one of a display target period and a display target region, to further display a time-series transition of the dense level information, based on the accepted specification, and cause the display to further:

display a dense region, which is classified into any of at least three dense levels, by superimposing the dense region on the image indicating the target region.

6. A video analysis method comprising, by a computer:

acquiring an interval between persons included in a video acquired by photographing a target region;

causing display means to display a time-series transition of first information relating to a number of persons with the acquired interval being equal to or less than a reference value, and causing the display to further display second information indicating a result of performing statistical processing on an appearance attribute of a person with the acquired interval being equal to or less than the reference value, wherein the second information comprises:

a number of persons according to the appearance attribute of the person with the acquired interval being equal to or less than the reference value, a composition ratio according to the appearance attribute of the person with the acquired interval being equal to or less than the reference value, a second appearance attribute having a largest number of belonging persons of persons with the acquired interval being equal to or less than the reference value, a number of persons who belongs to the second appearance attribute, a list of appearance attributes of members belonging to a group of persons whose interval is equal to or less than the reference value, or a list of appearance attributes arranged in descending order of a number the members belonging to the group of persons.

7. The video analysis apparatus according to claim 1, wherein the at least one processor is configured to execute the instructions to:

generate the first information relating to the number of persons with the acquired interval being equal to or less than the reference value, wherein generating the first information comprises to:

calculate the number of persons whose acquired interval is equal to or less than the reference value by detecting the persons whose acquired interval is equal to or less than the reference value from each image of a plurality of images, or acquire a ratio by acquiring a total number of persons included in each image of the plurality of images and dividing the number of persons whose acquired interval is equal to or less than the reference value by the total number.

8. The video analysis method according to claim 6, further comprising:

generating the first information relating to the number of persons with the acquired interval being equal to or less than the reference value, wherein generating the first information comprises:

calculating the number of persons whose acquired interval is equal to or less than the reference value by detecting the persons whose acquired interval is equal to or less than the reference value from each image of a plurality of images, or acquiring a ratio by acquiring a total number of persons included in each image of the plurality of images and dividing the number of persons whose acquired interval is equal to or less than the reference value by the total number.

9. The video analysis method according to claim 6, wherein the first information comprises:

a ratio of persons with the acquired interval being equal to or less than the reference value, or the number of persons with the interval being equal to or less than the reference value.

10. The video analysis apparatus according to claim 1, wherein the at least one processor is configured to execute the instructions to cause the display to display a graph indicating the time-series transition of the first information, the graph simultaneously presenting the first information corresponding to each of a plurality of timings within a specific period.

11. The video analysis method according to claim 6, further comprising causing the display to display a graph indicating the time-series transition of the first information, the graph simultaneously presenting the first information corresponding to each of a plurality of timings within a specific period.

* * * * *